Dec. 4, 1956   G. W. BEHNKE ET AL   2,772,769
SHAKER CONVEYING APPARATUS
Filed May 9, 1955   3 Sheets-Sheet 2
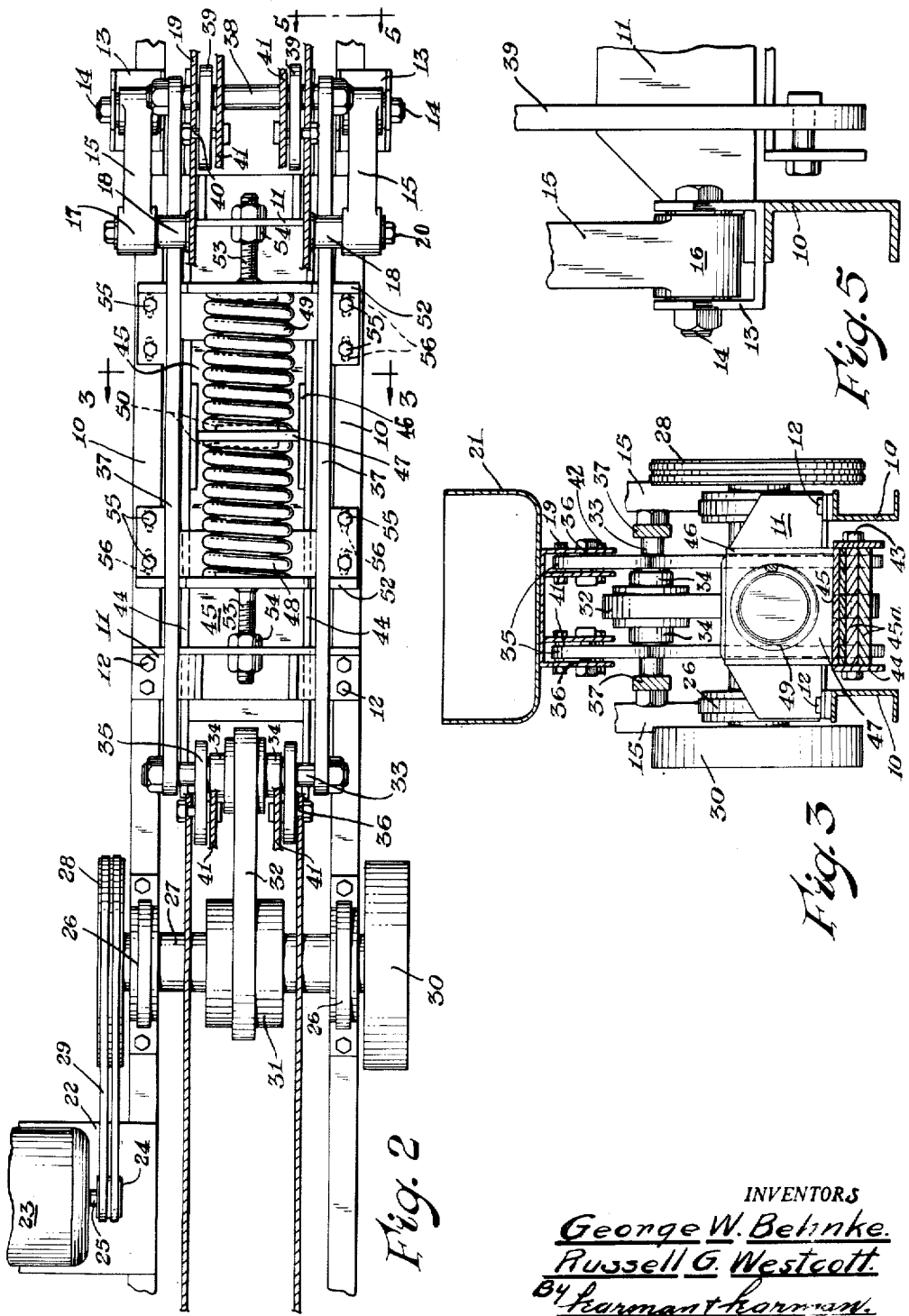
INVENTORS
George W. Behnke.
Russell G. Westcott.
BY Karman + Karman
ATTORNEYS

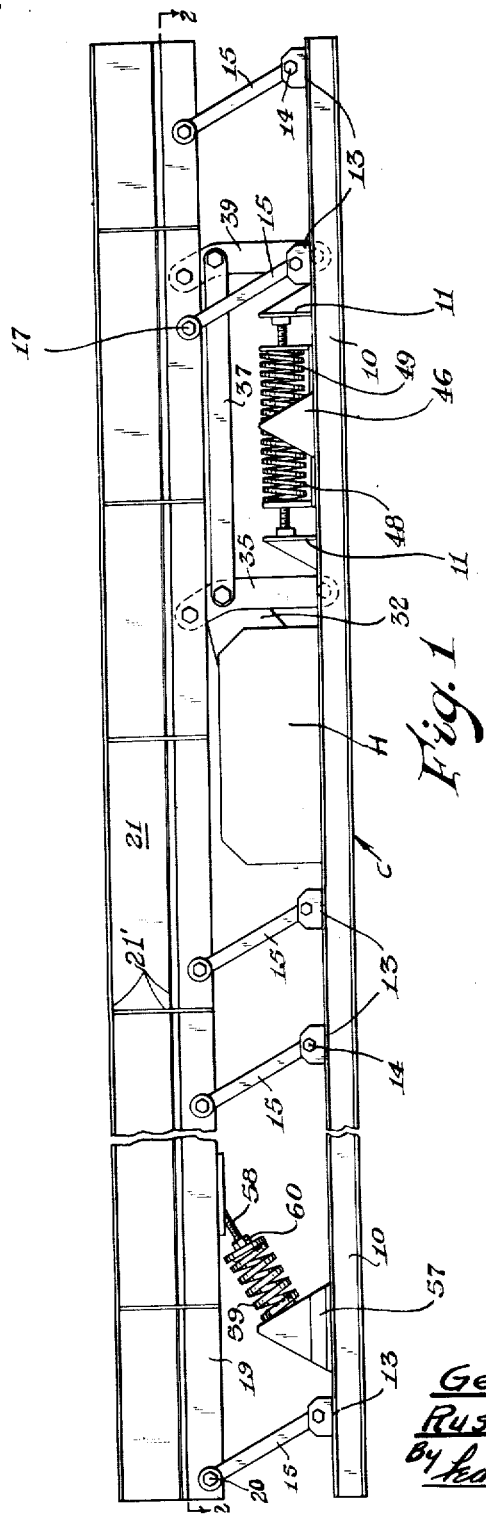

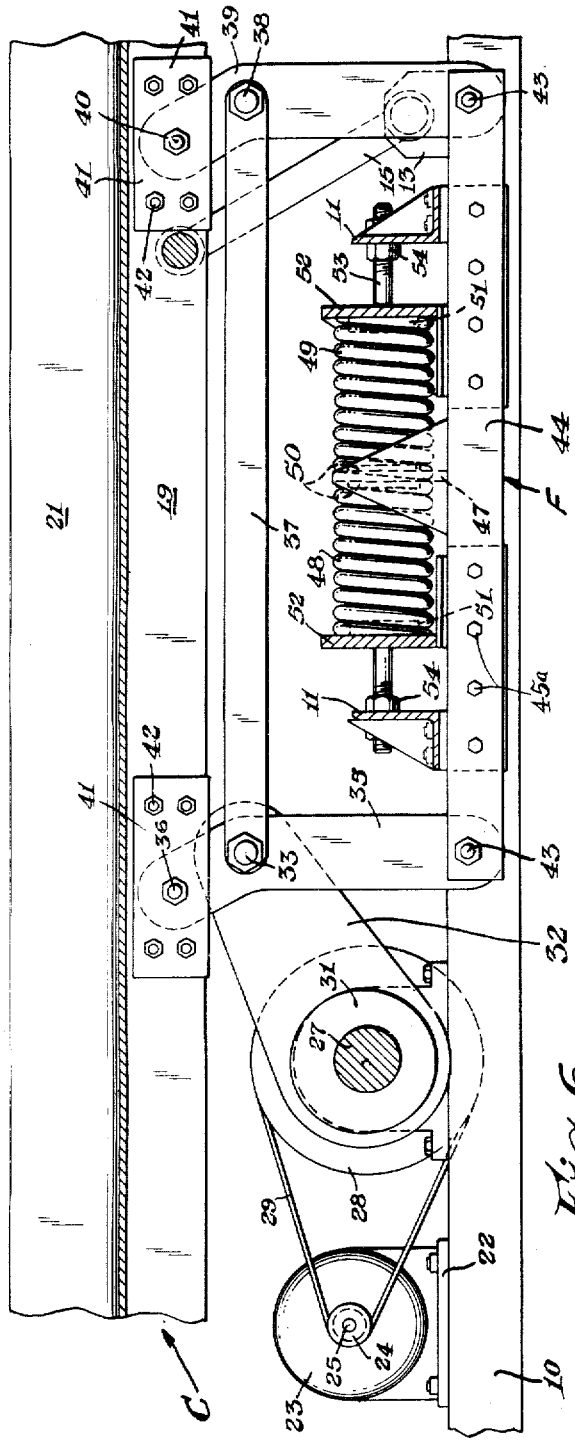
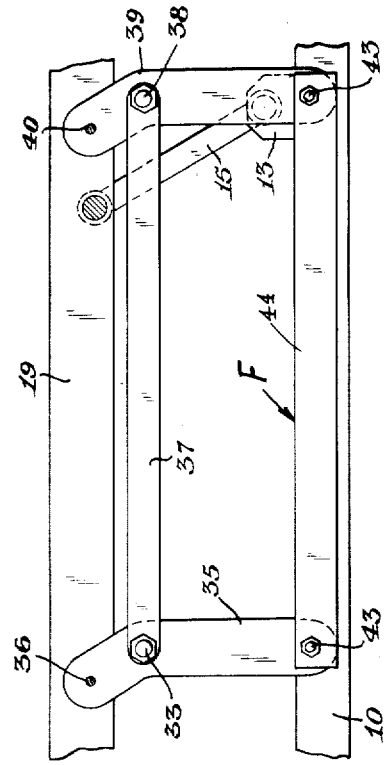

United States Patent Office 2,772,769
Patented Dec. 4, 1956

2,772,769

SHAKER CONVEYING APPARATUS

George W. Behnke and Russell G. Westcott, Durand, Mich., assignors to Simplicity Engineering Company, Durand, Mich., a corporation of Michigan Application May 9, 1955, Serial No. 506,904

6 Claims. (Cl. 198—220)

This invention relates to conveying apparatus and more particularly to a new and improved oscillating or vibrating conveyor of the type known generally as shaker conveyors which are employed principally to convey bulk materials of all kinds from one location to another.

One of the prime objects of the invention is to design a highly reliable and efficient shaker conveyor having a conveyor trough and an oscillating linkage assembly which is spring balanced or spring maintained in a manner to automatically increase or decrease the stroke of the conveyor pan as greater or lesser loads are applied thereto to thereby maintain the desired speed of travel of the material.

Another object of the invention is to design a shaker conveyor of simple and rugged construction which is suitable to convey a wide variety of materials of greatly varying weight per unit volume at the speed of travel desired.

A further object of the invention is to provide a shaker conveyor which avoids spilling of any material over its sides when the conveyor is overloaded by simply increasing the stroke of the pan.

Another object of the invention is to provide a vibratory conveyor in which the resilient forces maintaining the conveyor pan and oscillating linkage can be readily adjusted to vary the stroke of the conveyor and thus the speed of delivery of the material.

A further object of the invention is to design a shaker conveyor which is constructed to permit the pan to take a relatively long stroke thus providing a conveyor of high capacity.

Another object of the invention is to design a shaker conveyor which does not transmit an appreciable amount of harmful vibration to the floor supporting it so that the number of units employed in a given building or their size is goverened by available floor space and other considerations rather than by the extent of vibrations transmission.

A further object of the invention is to design a vibrating conveyor in which balancing means are provided which relieve the load upon the conveyor pan surface and linkage bearings and cushion the shocks transmitted to thus materially reduce fatigue and wear failures of these parts.

A still further object of the invention is to design a shaker conveyor of simple and practical construction which can be economically manufactured and assembled.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 1 is a side elevational view of the shaker conveyor.

Fig. 2 is a sectional plan view taken on the line 2—2 of Fig. 1.

Fig. 3 is a transverse, sectional view taken on the line 3—3 of Fig. 2.

Fig. 4 is a fragmentary, side elevational view of the linkage supporting the conveyor pan only.

Fig. 5 is a fragmentary transverse, elevational view showing links connected to the main frame members.

Fig. 6 is a partly fragmentary, sectional, side elevational view of the shaker conveyor taken on the line 1—1 of Fig. 4.

Referring now more particularly to the accompanying drawings in which we have shown a preferred embodiment of the invention, a letter C generally indicates our novel shaker conveying apparatus including longitudinally disposed base beams 10 which may be bolted to the floor of a building in which the conveyor is to be housed. The beams 10 are maintained in spaced apart relation by crossties 11 which are bolted to the beams as at 12 (see Fig. 2) and other crossties which are not shown. Mounted on the ends of both beams and at intervals between the ends thereof are pairs of U-shaped brackets 13 which support pins 14. Links 15 with bearings 16 formed on the lower ends thereof are pivotal on the pins 14, rubber bushings (not shown) being provided on the pins to absorb vibration as usual. The upper ends of the links 15 have bearings 17 formed thereon which are pivotally securred on trunnions 18 projecting outwardly from an inverse U-shaped pan support plate or frame 19 by nuts 20. The plate or frame 19 supports the conveyor pan or trough 21 and reinforces the same, and reinforcing ribs 21', such as shown in Fig. 1 only, may also be provided.

Bolted to one of the beams 10 is the base plate 22 of a motor 23 which has a drive pulley 24 mounted on the motor shaft 25 thereof. Pillow blocks 26 mounted on the beams 10 forwardly of the motor support a transverse shift 27 which has a pulley 28 mounted on the one end thereof so that it may be driven by a belt 29 trained around the motor pulley 24. Fixed on the opposite end of the shaft 27 is a fly wheel 30 as shown, and a housing such as shown at H in Fig. 1 only, may be provided for this drive mechanism if desired. The central portion of the shaft 27 has an enlarged eccentric 31 formed thereon and a connecting rod 32 pivotal thereon extends forwardly and upwardly from the eccentric. The rod 32 is pivotally connected to a shaft 33 between a pair of spacer collars 34 and the shaft 33 is in turn pivotally connected to a set of angular levers 35 whose upper ends are connected to the conveyor pan support 19 at 36. Connecting rods 37 connect the levers 35 with a shaft 38 which is similarly pivotally connected to a like set of levers 39. The angularly disposed upper ends of the levers 39 are pivotally connected to the pan support plate 19 at 40, and plates 41 bolted to the plate as at 42 form guides for the upper ends of the levers 39 as well as for the levers 35. The lower ends of the levers 35 and 39 are pivotally supported as at 43 by a slide frame F which comprises longitudinal members 44 connected by a horizontal plate 45, and the frame is weighted by plates 45a fixed to the members 44 by bolts 45b to provide a counterbalancing effect as will later be explained. A pair of triangular brackets 46 are welded to the plate 45 and fix a vertical plate 47 in position on the frame F. Heavy duty coil springs 48 and 49 are mounted on cups 50 on both sides of the plate 47, and on cups 51 on brackets 52 which are spaced outwardly from the plate 47. The brackets 52 have rigidly fixed, projecting, threaded rods 53 which extend through openings in the ties 11, and nuts 54 secure the brackets 52 in adjusted position relative to the plate 47. Bolts 55 which extend through slots 56 in the beams 10 adjustably secure the brackets 52 thereon. Obviously, the springs 48 and 49 can be preloaded as desired to properly balance the conveyor and provide the pan with a stroke of the desired length.

At the left end of the conveyor (see Fig. 1) a bracket 57 fixed to the beams 10 and a threaded rod 58 depending from the pan support 19 may support an auxiliary cushioning spring 59 therebetween, a nut 60 maintaining the spring preloaded to the extent desired. It will be noted that the spring is disposed substantially perpendicularly to the line of travel of the connecting rod 32 and to the links 15.

Levers 39 and spring cushioned slide frame assemblies may also be employed if desired rearwardly of the shaft 27 and connecting rods similar to those shown at 37 can be used to connect the levers with those shown at 35.

In operation the pan tends to settle as material is added thereto inasmuch as the upper ends of the levers 35 and 39 are offset with respect to the shafts 33 and 38 and tend to pivot the lower ends of the levers to the right. This tendency is, of course, cushioned by the springs 48 and 49, the spring 48 resisting elongation and the spring 49 resisting compression. The springs may be preloaded to properly balance an empty pan and when a load is added thereto the stroke of the pan will be varied in accordance therewith since the throw of the connecting rod remains constant.

As the throw of the eccentric 31 on the rapidly rotating shaft 27 imparts forward movement to the connecting rod 32 and shafts 33 and 38, the levers 35 and 39 move the pan shown in Fig. 6 rapidly from left to right, which motion is cushioned by the springs 48, 49 and 59, and these springs assist in returning the pan from right to left. This action is, of course, very rapid and the trough vibrates or oscillates to move the material in the pan very rapidly to the right. Obviously, the preloads on the springs can be individually adjusted by loosening the nuts 54 and the bolts 55, and adjusting the position of the brackets 52. Once these brackets are positioned as desired the stroke of the pan is automatically adjusted to suit the load to be carried.

It is to be understood that the foregoing drawings and descriptive matter are in all cases to be interpreted as merely illustrative of one form of the invention rather than as limiting inasmuch as we contemplate that various equivalent changes well within the scope of the appended claims may be made in the various elements which comprise the invention.

What I claim is:

1. In a shaker conveyor for transporting material in a given direction, a support structure, a conveyor pan above said structure, means pivotally connected to said structure and to said pan for supporting the latter above said support structure, depending lever means pivotally connected at one end thereof to said pan, eccentric means pivotally connected to said lever means interjacent its ends and at a point spaced to one side from a vertical plane passing through the point of connection of said lever means to said pan to oscillate the same, a frame member pivotally connected at the other end of said lever means and being movable relatively to said support structure, spring engageable means carried by said frame member, and spring means reacting between said support structure and said spring engageable means opposing pivoting of said lever means about the point of its connection to said eccentric means to maintain said pan at a predetermined level above said support structure for a given load but permitting settling of said pan relative to the eccentric means with increased load to automatically increase the stroke of the pan.

2. In a shaker conveyor for transporting material forwardly, a support structure, legs pivotally connecting said support structure and pan, angular lever means pivotally connected at one end to said pan and depending from said pan, the other end of said lever means being free of said support and said pan, eccentric means pivotally connected to said lever means interjacent the ends thereof and forwardly of the point of the connection of said lever means to the pan for oscillating the lever and pan in a generally forward direction, spring means opposing movement of the lower end of said lever means but permitting settling of the pan with increased load relative to the point of connection of said eccentric means to thereby automatically increase the stroke of said pan, the lower end of said lever means being unsupported except for said spring means.

3. In a substantially horizontally disposed shaker conveyor for transporting material forwardly, longitudinal support beams, a longitudinally disposed pan a spaced distance above said beams, rigid legs pivotally connecting the pan and support beams, the legs being inclined at a rearward angle from said beams, a pair of spaced apart angular levers including rearwardly inclined upper ends pivotally connected to the pan and substantially vertical lower ends, a shaft pivotally connecting said levers intermediate their ends, a connecting rod extending upwardly and forwardly pivotally connected to said shaft, eccentric means oscillating said rod and thereby said pan through said levers, a second pair of levers forwardly of said first mentioned pair of levers with angular upper ends connected to said pan, a shaft connecting said last mentioned pair of levers, longitudinal connecting rods for said shafts spanning said pairs of levers, a counterweighted slide frame pivotally carried by the lower ends of both pairs of levers, a transversely disposed vertical plate projecting from said frame interjacent its ends, supports adjustably fixed on said beams on both sides of said plate, and coil springs mounted between said supports and plate and cushioning movement of said frame, the lower ends of said levers being free except for said frame.

4. Shaker conveying apparatus comprising a support structure; a pan structure; means supporting said pan structure on said support structure for oscillating movement of the pan structure relative to the support structure; lever means pivotally connected at one end to said pan structure; eccentric crank means for oscillating said lever means connected to said lever means at a point spaced to one side of the vertical plane passing through the point of connection of said lever means to said pan structure so as to permit rotation of said lever means about the point of connection thereto of said crank means; and spring means reacting between the other end of said lever means and said support structure opposing rotation of said lever means about said point of connection.

5. The construction set forth in claim 4 including a frame member connected to the other end of said lever means and being slidable relatively to said support structure, and a plate secured to said frame member, said spring means being anchored between said plate and said support structure.

6. The construction set forth in claim 5 including means for adjusting the force with which said spring means opposes rotation of said lever means.

References Cited in the file of this patent
UNITED STATES PATENTS 2,123,189    Jacobsen    July 12, 1938
2,365,978    Strain    Dec. 26, 1944

Disclaimer 2,772,769.—*George W. Behnke* and *Russell G. Westcott*, Durand, Mich. SHAKER CONVEYING APPARATUS. Patent dated Dec. 4, 1956. Disclaimer filed Nov. 14, 1957, by the assignee, *Simplicity Engineering Company*.

Hereby enters this disclaimer to claims 1 through 6 of said patent.
[*Official Gazette December 17, 1957.*]